(12) United States Patent
Akerman

(10) Patent No.: US 9,629,375 B2
(45) Date of Patent: Apr. 25, 2017

(54) METHOD OF PRESERVING A FOOD PRODUCT

(71) Applicant: Michael J. Akerman, Passaic, NJ (US)

(72) Inventor: Emanuel Akerman, Mazkeret Batia (IL)

(73) Assignee: Michael J. Akerman, Passaic, NJ (US)

( * ) Notice: Subject to any disclaimer, the term of this patent is extended or adjusted under 35 U.S.C. 154(b) by 152 days.

(21) Appl. No.: 14/153,827

(22) Filed: Jan. 13, 2014

(65) Prior Publication Data

US 2014/0127359 A1    May 8, 2014

(51) Int. Cl.
*A23B 5/14* (2006.01)
*A23B 4/00* (2006.01)
(Continued)

(52) U.S. Cl.
CPC .................. *A23B 5/14* (2013.01); *A23B 4/00* (2013.01); *A23B 4/12* (2013.01); *A23B 4/20* (2013.01); *A23B 4/24* (2013.01); *A23B 5/005* (2013.01); *A23B 5/0052* (2013.01); *A23B 5/12* (2013.01); *A23B 5/18* (2013.01); *A23B 5/20* (2013.01); *A23B 7/00* (2013.01); *A23B 7/10* (2013.01); *A23B 7/154* (2013.01); *A23B 7/157* (2013.01); *A23B 9/24* (2013.01); *A23B 9/26* (2013.01);
(Continued)

(58) Field of Classification Search
CPC .. A23B 4/00; A23B 4/12; A23B 5/005; A23B 5/0052; A23B 5/08; A23B 5/12; A23B 5/14; A23B 5/18; A23B 5/20; A23B 7/00; A23B 7/71; A23B 4/20; A23B 4/24; A23B 7/154; A23B 7/157; A23B 9/24; A23B 9/26; A23B 9/30; A23L 3/00; A23L 3/34; A23L 3/3454; A23L 3/3463; A23L 3/3481; A23L 3/3508; A23L 3/3589; A23V 2200/06; A23V 2200/10; A23V 2250/04; A23V 2250/042; A23V 2250/044; A23V 2250/046; A23V 2250/056; A23V 2250/15; A23V 2250/156; A23V 2250/16; A23V 2250/1614; A23V 2250/60; A23V 2250/64; A23V 2250/6402; A23V 2250/6406; A23V 2002/00
USPC ... 426/89, 92, 102, 321, 323, 531, 614, 652, 426/654, 478, 479, 480
See application file for complete search history.

(56) References Cited

U.S. PATENT DOCUMENTS 2,593,223 A * 4/1952 Trelease et al. .............. 426/131
4,164,589 A * 8/1979 Kadane ................ A23B 4/0235
426/265

(Continued)

FOREIGN PATENT DOCUMENTS

DE 19915028 10/2000
FR 2413044 7/1997

(Continued)

OTHER PUBLICATIONS

English Translation of FR2413044 published Jul. 1979.*
English Translation of DE19915028 published Oct. 2000.*

*Primary Examiner* — Anthony Weier
(74) *Attorney, Agent, or Firm* — Michael J. Feigin, Esq.; Feigin & Fridman

(57) ABSTRACT

A food product is within an aqueous solution. The solution includes: at least one edible acid; and at least one osmotic agent, wherein after the solution reaches equilibrium with the food product, the pH of the solution is between about 1 and 5.

12 Claims, 2 Drawing Sheets

(51) Int. Cl.
| | |
|---|---|
| *A23B 5/20* | (2006.01) |
| *A23B 5/005* | (2006.01) |
| *A23B 5/12* | (2006.01) |
| *A23B 7/00* | (2006.01) |
| *A23L 3/34* | (2006.01) |
| *A23L 3/00* | (2006.01) |
| *A23L 3/3454* | (2006.01) |
| *A23L 3/3481* | (2006.01) |
| *A23L 3/3463* | (2006.01) |
| *A23L 3/3589* | (2006.01) |
| *A23L 3/3508* | (2006.01) |
| *A23B 5/18* | (2006.01) |
| *A23B 4/12* | (2006.01) |
| *A23B 4/20* | (2006.01) |
| *A23B 4/24* | (2006.01) |
| *A23B 7/10* | (2006.01) |
| *A23B 7/154* | (2006.01) |
| *A23B 7/157* | (2006.01) |
| *A23B 9/24* | (2006.01) |
| *A23B 9/26* | (2006.01) |
| *A23B 9/30* | (2006.01) |

(52) U.S. Cl.
CPC ...... *A23B 9/30* (2013.01); *A23L 3/00* (2013.01); *A23L 3/34* (2013.01); *A23L 3/3454* (2013.01); *A23L 3/3463* (2013.01); *A23L 3/3481* (2013.01); *A23L 3/3508* (2013.01); *A23L 3/3589* (2013.01); *A23V 2002/00* (2013.01)

(56) References Cited

U.S. PATENT DOCUMENTS

2003/0148009 A1\* 8/2003 Bodor et al. ................. 426/321
2006/0034994 A1\* 2/2006 Abboud ................ A23C 3/085
    426/580

FOREIGN PATENT DOCUMENTS

| JP | 59055177 | | 3/1984 | |
| JP | 59055177 A2 | * | 3/1984 | ............... A23L 3/34 |
| KR | 1020080101258 | * | 11/2008 | |

\* cited by examiner

METHOD OF PRESERVING A FOOD PRODUCT

FIELD OF THE INVENTION

The present invention relates to the food industry, in particular, preserving food, for example eggs.

BACKGROUND OF THE INVENTION

Eggs have a shell that offers limited protection from bacterial penetration. A number of egg characteristics influence penetration, growth and spoilage by micro-organisms. Before hatching, the egg passes through the end of the intestinal tract and thus is subjected to the micro-flora therein. In addition, eggs are highly sensitive to contamination by pathogenic microorganisms if not stored in proper conditions. Contaminants, like bacteria or molds, have the potential of spoiling the eggs or posing serious health risks to their consumers. Methods of preserving eggs for prolonged periods include refrigeration, cooking, freezing, drying and powdering, pasteurization and pickling. Pickled eggs are prepared by immersing cooked peeled eggs in an acidic solution, like vinegar, typically also containing salt, sugar, spices, or any combination of these ingredients. Methods for pickling raw eggs, or raw egg yolks, are also available. Pickled eggs prepared by such methods can be preserved for a period ranging from a few weeks up to several months.

The ingredients of the pickling solution, in addition to their contribution to the product's taste, odor, color and texture, have an active role in preventing the growth of contaminants. The optimal pH for the growth of most micro-organisms is near the neutral point (pH 7.0). As a result, the acidity of the pickling solution is adjusted to a pH lower than 7, thus contaminant growth is impeded.

Addition of sugar and salt increases the solute concentration in the pickling solution beyond the solute concentration in the contaminant cells, thus rendering the solution "hypertonic"; in other words the addition of solutes to the pickling solution increases its osmotic pressure. Thus, the solutes in the solution are referred to as osmotic agents. Since the osmotic pressure inside the contaminants' cells is lower than the osmotic pressure of their environment, water exits the contaminants' cells, thus lowering their vitality.

Such methods are disclosed for example in U.S. Pat. No. 1,234,567 and EP 1,234,567.

SUMMARY OF THE INVENTION

The present invention relates to preserving eggs.

In accordance with embodiments of one aspect of the present invention there is provided a food product within an aqueous solution, the solution comprising: at least one edible acid; and at least one osmotic agent, wherein after the solution reaches equilibrium with the food product, the pH of the solution is between about 1 and 5.

In accordance with embodiments of another aspect of the present invention there is provided a method of preserving a food product, comprising: (a) immersing the food product in an aqueous solution; (b) adding an osmotic agent to the solution; (c) adding at least one edible acid to the solution; and (d) adjusting the pH of the solution to a final range of 1-5.

BRIEF DESCRIPTION OF THE DRAWINGS

The present invention will be understood and appreciated more fully from the following detailed description taken in conjunction with the appended drawings in which.

The following detailed description of embodiments of the invention refers to the accompanying drawings referred to above. Wherever possible, the same reference numbers will be used throughout the drawings and the following description to refer to the same and like parts.

DESCRIPTION OF EMBODIMENTS OF THE INVENTION

Illustrative embodiments of the invention are described below. In the interest of clarity, not all features/components of an actual implementation are necessarily described.

It should be understood, the present method can be used to preserve shelled eggs or eggs still in their shells.

It is a particular feature of embodiments of the present invention, to provide a food preserving method, using pH reducing substances in a solution, combined with one or more osmotic agents, to provide a food product having an extended shelf-life at ambient temperature. However, the method does not deleteriously affect the taste or other organoleptic aspects of the food product.

The following disclosure describes the common implementation of the method/process of the present invention on an egg product; and the egg product itself. However, the method may be adapted for use with a variety of other food products.

Figure 1:
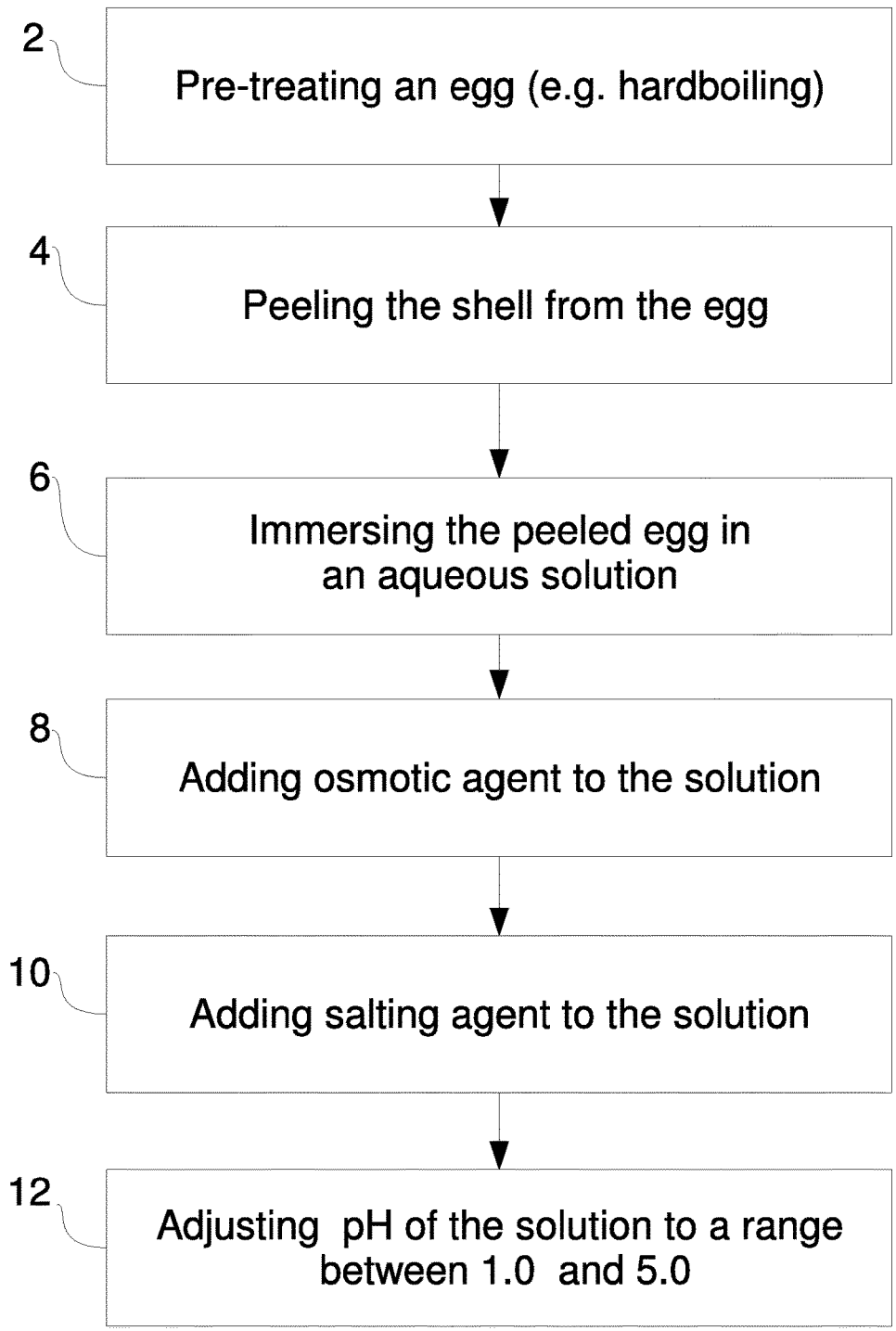
FIG. 1 is a flow chart of an embodiment of a method of preserving an egg in accordance with the present invention.

FIG. 1 shows a flow chart depicting the steps of an embodiment of a method/process of preserving an egg. Step 2 includes pre-treating the egg by hard-boiling a whole egg including the egg shell; step 4, peeling the shell from the hard-boiled egg (manually or otherwise); step 6, immersing the peeled egg in an aqueous solution; step 8, adding one or more osmotic agents to the solution; step 10, adding salting agents to the solution; and in step 12, adjusting the pH of the solution to a final pH between 1.0 to 5.0 (preferably 2.0 to 4.0), by adding one or more pH reduction substances, i.e. edible strong acids, edible weak acids or a combination thereof to the solution.

In step 8, osmotic agents are added to the solution to increase the concentration of solutes within the solution to a concentration which is sufficiently higher than the expected concentration of micro-organisms in the solution, i.e. a hypertonic concentration. As a result, dehydration of the cells of the micro-organisms occurs, whereby a substantial amount of the micro-organisms within the solution are destroyed.

Sugars such as sucrose, maltose dextrose and fructose, in addition to their sweetening affect, can be used as osmotic agents. However, such sugars may have the side effect of promoting fermentation of bacteria or other micro-organisms, which may be undesirable. Alternatively, sweeteners such as, polyols, which are not fermentable or utilized by micro-organisms and still contribute to the sweetness of the egg, can be used as osmotic agents.

Exemplary polyol osmotic agents suitable for the method of the present invention include: glycerol (glycerin), erythritol, hydrogenated glucose hydrolysates (HGH), inositol, isomalt, lactitol, maltitol, mannitol, polyglucitol (Hydrogenated Starch Hydrolysates—HSH), sorbitol and xylitol. They can be used either singly or in combination.

In step 10, salting agents are added to the solution to provide flavoring to the eggs, as well as to provide a preserving effect by increasing the hypertonicity of the solution, thereby reinforcing the osmotic pressure therein. In some embodiments, salting agents are used as osmotic agents as well. The salting agents can be used either instead of the polyols or in addition thereto.

Exemplary salting agents suitable for the method of the present invention include: potassium chloride, potassium lactate, sodium chloride and sodium nitrate. They can be used singly or in combination.

In some embodiments, adjusting the pH of the solution (step 12) is carried out in two stages. In a first stage, weak acids, strong acids or combination thereof are added to the solution. This first stage brings the pH of the solution to the approximately desired pH range (typically between 2 and 4). In the second stage, an additional controlled amount of acid is added. Typically, this second stage is carried out if after a sufficient equilibration period with the basic pH of the egg (immersed in the solution) increases the pH level of the solution above the desired range (2-4).

In some embodiments, if after the first or second stage the pH of the solution is lower than the desired pH range, one or more edible alkalinic agents are added to the solution. The reaction between the alkalinic agents and the edible acids can provide an additional source of salts to the solution. As mentioned, salts are optional osmotic agents, and/or salting agents.

Edible acids usable in the method of the present invention can be organic or inorganic acids; and include, for example, acetic acid, adipic acid, aminoacetic acid, ascorbic acid, aspartic acid, boric acid, butyric acid, caffeic acid, caffeotannic acid, caprylic acid, carbonic acid, chlorogenic acid, cinnamic acid, citric acid, corosolic acid, formic acid, fumaric acid (boletic acid), gallic acid (3,4,5-trihydroxybenzoic acid), gluconic acid, glutamic acid, hyaluronic acid, hydrochloric acid, lactic acid, linoleic acid, malic acid, meta tartaric acid, oxalic acid, phenylactic acid, phosphoric acid, phytic acid, salicylic acid, sialic acid, succinic acid, sulphuric acid, tannic acid, tartaric acid, thiodipropionic acid and vinegar e.g. made of cider, red wine, white wine or rice. These edible acids can be used either singly or in combination. Preferred acids that do not leave an acrid, sour or tart aftertaste are preferable; for example, citric and malic acids and low concentration vinegar.

It should be noted, that when using weak acids, for example, acetic acid, the un-dissociated molecule of the weak acid, as well as the portion that is ionized, plays a role in the osmotic relationship between the solution surrounding the egg and the solution internal to the bacterial cell, i.e. weak acids perform the function of osmotic agents as well.

It should be noted that, in the context of eggs, the preserving process of the present invention can be adapted for use not only with a hard-boiled egg, but for a fried egg as well. In such case, step 2 of the process is frying the egg instead of hard-boiling the egg. The same goes for poached and scrambled eggs and the like, mutatis mutandis.

Figure 2:
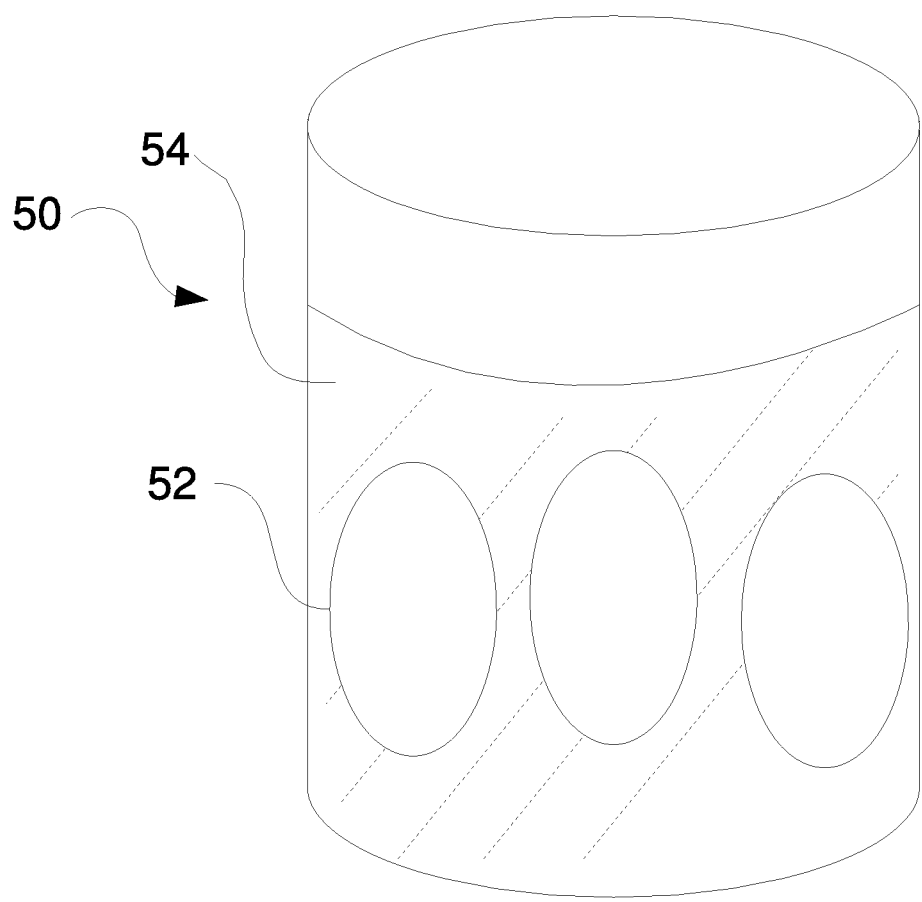
FIG. 2 is a perspective view of an embodiment of a food product in accordance with the present invention.

FIG. 2 depicts an embodiment of an egg product 50 of the present invention including a cooked egg 52 (typically shelled), preserved in an aqueous solution 54. The solution includes one or more edible acids and one or more osmotic agents and the final pH of the solution is 1-5, and preferably 2-4. The pH adjustment is carried out either by adding one or more edible acids to the aqueous solution; and in some embodiments includes alkalinic agents. The osmotic agents create an osmotic pressure to impede growth of contaminant micro-organisms as explained above.

In some embodiments, one or more salting agents are added to the solution, mostly for flavoring, however they may act as osmotic agents as well.

In some embodiments, one or more of the agents used to produce the aqueous solution are initially solid, typically in powder or granular form. Some, and perhaps nearly all of the appropriate osmotic agents, in particular the polyols and sugars, are available in powder or granular form; some, and perhaps nearly all of the appropriate edible acids are available in powder or granular form, especially some of the organic acids, but perhaps some inorganic acids as well. As such, the powder/granules can be mixed and then dissolved in water. Similarly, the edible alkalinic agents, which may be added after the first or second stage if the pH of the solution is lower than the desired pH range, can also be provided in solid form.

Experimental evidence has shown several species of bacteria commonly associated with eggs are affected by a low pH level. In particular, we have found that a pH level of 2-4 is most suitable for inhibiting the growth and presence of contaminant micro-organisms within the egg/solution. However, a pH level of 1-5 can be used as well.

The experiments in the below examples were monitored in accordance with the regulations of the Ministry of Health in Israel.

Example 1

Nine peeled hard-boiled small chicken eggs were immersed in 200 grams of 5% vinegar to which 70 grams of glycerin and 50 grams of boiling water containing 13.5 grams of sodium chloride were added. The initial pH of the mixed (preserving) solution was about 3.0. Analytical tests revealed that the pH of the chicken eggs was 4.0; the pH of the preserving solution was 4.2; and after two weeks the total bacterial count of the chicken eggs was less than 10 as was the count for the preserving solution. Two weeks after immersion, the chicken eggs were tasted by six people with very positive responses.

Example 2

Nine peeled, hard-boiled small chicken eggs were immersed in a solution of 100 g vinegar (5% acetic acid) from "Osem Investments Ltd.", Petah Tikva, Israel, containing 35 g of glycerin, 13.5 g of table salt (NaCl) and 35 g of 1 N HCl. The resultant pH was initially about 2.5. After about 20 hours, the pH rose to 4.5 at which time 20 cc of 1N HCL was added to lower the pH again to 2.5.

Example 3

Nine peeled hard-boiled small chicken eggs were immersed in 100 g vinegar (5% acetic acid) from "Osem Investments Ltd.", Petah Tikva, Israel; 50 cc of about 7% by weight of HCl; 70 g of glycerin; 18 g of table salt; and 100 g of bottled water. The initial pH was about 0.5. After 2 hours, 130 ml of 1 N NaOH was added and the pH rose to a range of 3.0-3.5.

Example 4

Example 3 was repeated except citric acid (5 g of in 100 cc of bottled water) was used instead of vinegar, and after 2 hours 10 g of 7% HCl solution was added. The resulting pH was 1.5-2.0. This was followed by neutralization with about 35 ml of 1 N NaOH which brought the pH to about 3.0. Five days later, the chicken eggs had a good aroma and taste.

Example 5

Example 4 was repeated, however with pheasant eggs, weighing about 13 g each. After about 12 hours the pH was about 3.0-3.5 and both the aroma and taste were quite good.

As above-mentioned, additional food products may be applicably used with the process of the present invention. Exemplary food products include, but are not limited to: relatively high-protein food, such as cheese (or other suitable dairy product), meat and fish products; soya products, in particular, tofu, fruits and vegetables. In such case, steps 2 and 4 of the process may be appropriately skipped or adjusted to other pre-treating actions, for example cutting the cheese product to be easily immersed within the solution or the like.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

What is claimed is:

1. A pre-treated egg immersed in an aqueous solution, said solution comprising:
    a hard-boiled egg;
    at least three osmotic agents selected from any of edible acids, edible alkalinic agents, and salt agents; and
    at least one polyol;
    wherein the pH of the solution is 1.0 for a period of time and said aqueous solution reaches equilibrium with said hard-boiled egg's pH is raised to between 2 and 4 and left for a period of at least two weeks at ambient temperature whereinafter a number of bacteria found in said aqueous solution and in said hard-boiled egg is less than 10.

2. The product as in claim 1, wherein said at least one polyol is a sweetening agent.

3. The product as in claim 1, wherein one of said osmotic agents is a salting agent.

4. The product as in claim 3, wherein said at least one salting agent is selected from the group consisting of: potassium chloride, potassium lactate, sodium chloride and sodium nitrate or a combination thereof.

5. The product as in claim 1, wherein said at least one edible acid is inorganic acid.

6. The product as in claim 1, wherein said at least one edible acid is organic acid.

7. The product as in claim 1, wherein said at least one edible acid is selected from the group consisting of: acetic acid, adipic acid, aminoacetic acid, ascorbic acid, aspartic acid, boric acid, butyric acid, caffeic acid, caffeotannic acid, caprylic acid, carbonic acid, chlorogenic acid, cinnamic acid, citric acid, corosolic acid, formic acid, fumaric acid (boletic acid), gallic acid (3,4,5-trihydroxybenzoic acid), gluconic acid, glutamic acid, hyaluronic acid, hydrochloric acid, lactic acid, linoleic acid, malic acid, meta tartaric acid, oxalic acid, phenylactic acid, phosphoric acid, phytic acid, salicylic acid, sialic acid, succinic acid, sulphuric acid, tannic acid, tartartic acid, thiodipropionic acid, and vinegar.

8. The product as in claim 1, wherein said at least one polyol is selected from the group consisting of: glycerol (glycerin), erythritol, hydrogenated glucose hydrolysates, inositol, isomalt, lactitol, maltitol, mannitol, polyglucitol, sorbitol, or xylitol or a combination thereof.

9. A method for preserving an egg by using edible agents exclusively, said method comprising:
    pre-treating said egg by hard-boiling;
    immersing the pre-treated egg in an aqueous solution, said aqueous solution provided with at least one of an edible acid, an edible alkalinic agent, and a salting agent;
    adding a polyol
    adjusting the pH of said solution to a final value of about 1; and
    leaving said pre-treated egg for at least two weeks, said pre-treated egg having a bacteria count of less than 10.

10. The method as in claim 9, wherein immersing said food product entails immersing a product from the group consisting of: a meat product; a dairy product; a fish product; a soya product; and a fruit.

11. The method of claim 9, wherein said pH of said final value is 1.

12. A method of preserving a hard-boiled egg comprising the step of:
    immersing said hard-boiled egg in a mixture of vinegar, glycerin, and salt with a pH of about 3.0 while said hard-boiled egg retains a higher pH than that of said mixture;
    leaving said hard-boiled egg in said mixture for a period of at least two weeks at ambient temperature;
    causing said hard-boiled egg to have a bacteria count of less than 10 after said two weeks time.

* * * * *